Oct. 19, 1943.   A. W. HANSON   2,332,485
VINYLIDENE CHLORIDE FIBERS
Filed Sept. 2, 1941
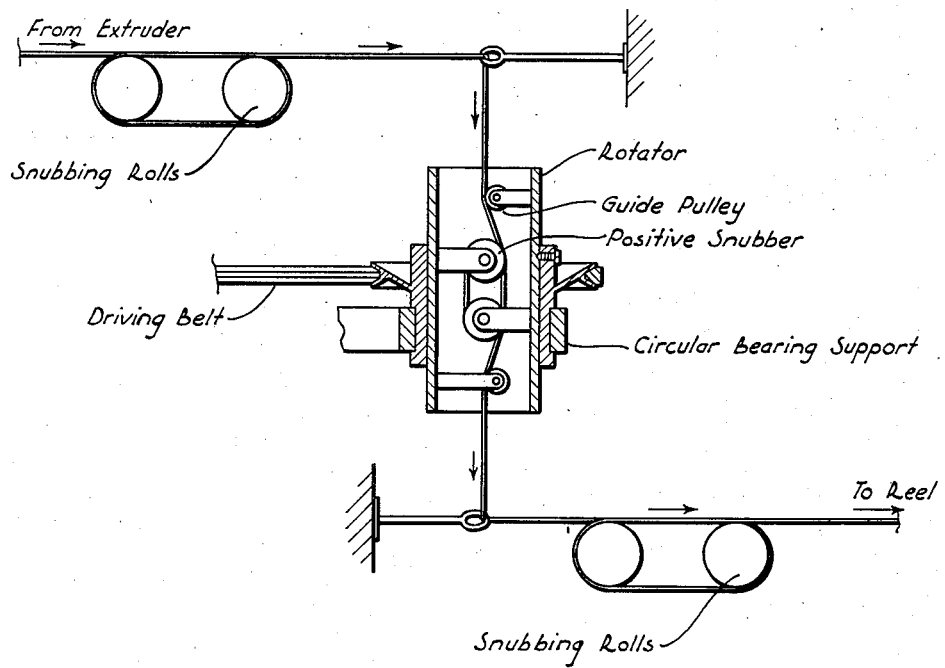
INVENTOR.
Alden W. Hanson
BY
Griswold & Burdick
ATTORNEYS Patented Oct. 19, 1943

2,332,485

UNITED STATES PATENT OFFICE 2,332,485

VINYLIDENE CHLORIDE FIBERS

Alden W. Hanson, Midland, Mich., assignor to The Dow Chemical Company, Midland Mich., a corporation of Michigan Application September 2, 1941, Serial No. 409,290

3 Claims. (Cl. 18—54)

This invention relates to filaments, including threads, narrow tapes, and the like fabricated from the normally crystalline polymers and co-polymers of vinylidene chloride, which articles have the crystallites oriented substantially along the fiber axis and exhibit characteristics commonly associated with natural fibers, and to the manner in which such articles may be made.

In contrast with most of the synthetic polymers, which are amorphous, the polymer of vinylidene chloride alone and many of its co-polymers with other polymerizable materials wherein the vinylidene chloride predominates as well as their plasticized compositions are found to be crystalline when examined by X-ray diffraction methods, or between crossed Nicol prisms. This crystallinity is submicroscopic, but materially affects the manner in which these polymers may be worked, and contributes to them a number of unusual and valuable properties not possessed by the amorphous polymers. As herein used, the term "normally crystalline vinylidene chloride polymer" includes the polymer of vinylidene chloride alone and co-polymers of vinylidene chloride with other polymerizable materials as well as their plasticized compositions which exhibit crystalline regions by either of the methods just mentioned, which compositions retain the working characteristics of the crystalline polymers.

Normally crystalline vinylidene chloride polymers can be formed into filaments which are capable of being cold drawn, or elongated under application of tensile stress into fibers which show molecular orientation of the crystallites along the fiber axis. The oriented filaments are stronger and more flexible than the unoriented filaments from which they were prepared and are of much greater utility in the preparation of fabrics and yarn.

Filaments may be prepared from a normally crystalline vinylidene chloride polymer by any of several common methods. Among the practical methods for doing this is the process which comprises extruding the hot molten polymer and drawing the extruded polymer down to the desired dimension, or merely drawing filaments continuously from a molten mass of the polymer. Another method comprises spinning filaments or threads from liquid media and evaporating or extracting the media from the so-formed articles.

When normally crystalline vinylidene chloride polymer is heated to a temperature above its crystalline melting point but below its decomposition point until crystallinity disappears and then cooled in such manner as to bring it to a temperature below its crystalline melting point without substantial recrystallization, it is said to be in the "supercooled" state. While in this supercooled state the polymer can readily be plastically deformed at room temperature under moderate pressure or tension and when in the form of filaments can easily be cold drawn under application of tension into strong flexible fibers which show orientation of the crystallites along the fiber axis.

The supercooled state of these polymers is described in U. S. Patents 2,183,602 and 2,233,442. It has been disclosed to subject the supercooled form of a normally crystalline vinylidene chloride polymer to cold stretching to effect a recrystallization thereof and to produce a fiber orientation of the crystallites which has been described as being along the axis of the filament or parallel to the surface of a film. The so-oriented crystallites are aligned predominantly parallel to one another.

Most of the materials co-polymerizable with vinylidene chloride do not in themselves exhibit characteristic crystalline X-ray diffraction patterns and many of the co-polymers of vinylidene chloride containing large proportions of these materials are incapable of being drawn into strong flexible filaments. There is, then, an upper limit of the amount of material co-polymerized with the vinylidene chloride for the purpose of the present invention. In general the co-polymers of vinylidene chloride which exhibit characteristic X-ray diffraction patterns may contain from about 5 to about 30 per cent by weight of the other polymerizable component. In the case of most co-polymers of vinylidene chloride there should be less than 20 and usually less than 15 per cent of the other polymerizable component. The practical upper limit of 15 per cent of co-polymerizable material applies to co-polymers of vinylidene chloride with vinyl chloride, vinyl acetate, styrene, ethyl acrylate, methyl acrylate, methyl methacrylate, and many other co-polymerizable compounds.

In general, cold-drawn filaments prepared from supercooled vinylidene chloride polymer are smooth straight threads, substantially circular in cross section, and possess relatively little stretch. When woven or knitted into fabric they produce slick lustrous articles in which the filaments readily slip between each other because of their uniform physical characteristics and consequent lack of friction between the filament surfaces. When spun into threads the filaments have a tendency to unwind because of their smoothness and the natural tendency of the individual filaments to regain the shape they had when crystallinity occurred. The uniform cross-sectional shape and smooth surfaces of the filaments produce little, if any, friction between the filament surfaces and no interlocking of the filaments such as that obtained by the spinning and weaving of most natural fibers. Furthermore, the filaments have relatively little elasticity.

It is, accordingly, an object of the present invention to provide strong flexible fibers of a normally crystalline vinylidene chloride polymer in which the crystallites are oriented predominantly along the fiber axis. It is another object to provide filaments having an irregular cross-sectional shape and a crinkled lengthwise shape, which filaments are elastic and readily interlock with one another to produce increased frictional resistance to slipping of the filaments when spun into yarn or woven into fabric. It is still another object to provide such filaments which exhibit characteristics commonly associated with natural fibers. Other and related objects will appear hereinafter.

I have now found that filaments showing orientation of the crystallites along the fiber axis and which possess a crinkled coiled shape can be made from normally crystalline vinylidene chloride polymers in a simple manner, and that numerous advantages are attendant upon the filaments so produced. The method comprises providing filaments of a normally crystalline vinylidene chloride polymer in the supercooled state and cold-working the filaments in a particular manner while in the supercooled state so as to extend them concurrently in more than one direction, thereby to effect recrystallization of the polymer and to provide crinkled filaments in which the crystallites are oriented along the fiber axis. The new filaments may be produced by a method of simultaneously stretching and false twisting together two or more supercooled filaments of a normally crystalline vinylidene chloride polymer, and maintaining them in this twisted and stretched condition until sufficient crystallinity occurs to result in shaping of the filaments in a permanently crinkled condition.

In practicing the invention, two or more supercooled filaments, prepared from a normally crystalline vinylidene chloride polymer, are passed over two sets of snubbing rolls between which they are simultaneously stretched and given a false twist. The annexed drawing illustrates diagrammatically suitable apparatus for carrying out the operation of simultaneously stretching and false twisting the filament. It is to be understood that any desired degree of stretch may be imparted by running the second set of snubbing rolls at a rate in excess of the rate at which the filaments are fed over the first set of snubbing rolls. The positive snubber within the rotator insures a twist in the filament, which must come out before the second set of snubbing rolls outside the rotator takes the filament. This stretching and twisting effects recrystallization of the polymer, orients the crystallites along the fiber axis and produces the crinkled filaments. The crinkled shape is produced by reason of the inherent crystalline structure of the polymer and the fact that the filaments are in a twisted or coiled shape when crystallinity occurs. The tension to provide the desired amount of stretch can be easily controlled by any convenient means such as for example, running the snubbing rolls at different speeds and providing means whereby the speeds of the snubbing rolls can be varied with relation to each other. The amount of twist to be imparted to the filaments can be controlled by any conventional and desirable means known to the spinning art which produces a false twist.

In said annexed drawing, the bundle of filaments 1 from an extruder (not shown) is run over a set of snubbing rolls 2 and thence through an eye 3 to the false twisting assembly. The assembly comprises a cylindrical shell 4 which is supported by and rotates in a circular bearing 5, the rotating shell 4 carrying a belt-driven V-pulley 6. Inside the rotator is a guide pulley 7 which directs the bundle of filaments 1 onto a set of snubbing rolls 8 from which the filaments move through a take-off pulley 9 out of the false twisting assembly. The filaments pass through an eye 10 and over a set of snubbing rolls 11 to a take-up reel (not shown).

The following example illustrates one method of producing filaments falling under the present invention:

A co-polymer consisting of 90 per cent vinylidene chloride and 10 per cent vinyl chloride, plasticized with 7 per cent of its weight of di-(alpha-phenylethyl) ether, having a crystalline melting point of 165° C. was heated in the chamber of an extrusion press to about 190° C. and extruded through a die containing 20 orifices each 0.003 inch in diameter. The hot extruded filaments were chilled by immersion in a bath of ice and water from which they were removed while in the supercooled state and passed at room temperature over a set of snubbing rolls, through a means for imparting a false twist of 6 turns per inch of length to the bundle of filaments and then over a second set of snubbing rolls which were rotating at a faster speed than the first set of snubbing rolls. Thus, between the two sets of snubbing rolls the filaments were simultaneously subjected to the operations of stretching and false twisting. The stretching reduced the diameter of the filaments to 0.0015 inch, which corresponds to an increase in length of about 300 per cent. The bundle of filaments coming off the second set of snubbing rolls was a loose bundle of crinkled filaments which had an irregular cross-sectional shape that could easily be observed when viewed under the microscope. They had a "hand" similar to that of wool fibers and exhibited orientation of the crystallites along the fiber axis when examined by X-ray diffraction methods. The simultaneous operations of stretching and false twisting the supercooled filaments effects recrystallization of the normally crystalline vinylidene chloride polymer and at the same time produces orientation of the crystallites. The partial recrystallization of the polymer while the filaments are in a twisted condition sets the filaments in a crimpy shape.

It is specifically pointed out that the twist imparted to the bundle of filaments is a "false" twist. By placing the false twisting device between the two sets of snubbing rolls as described in the foregoing example that portion of the bundle of filaments between the first set of snubbing rolls and the false twisting device receives a given number of turns of twist in one direction and the portion of the bundle of filaments between the false twisting device and the second set of rolls receives a like number of turns of twist in the opposite direction. The net amount of twist imparted to the bundle of filaments between the two sets of snubbing rolls is therefore zero or as it is commonly called in the spinning art a "false" twist.

The false twisting of the bundle of filaments as it passes between the two sets of snubbing rolls amounts to putting a twist into the bundle of filaments and then taking it out. However, the twisting of the bundle of supercooled filaments winds the individual filaments around one another and this operation occurring simultaneously with the stretching operation plastically deforms the filaments into irregular shapes, orients the crystallites and effects at least partial recrystallization of the polymer while the filaments are twisted which sets the individual filaments in a crimpy coiled shape and imparts a crinkliness thereto.

The degree of false twist and consequently the amount of crinkliness imparted to the individual filaments will depend upon the size and number of filaments twisted together and also upon the amount of false twisting. It is apparent that two filaments which have a very small diameter can be twisted together to produce a greater number of twists per inch of filament length, and consequently a greater degree of crinkliness, than can be obtained by twisting together two filaments which have a larger diameter. When more than two filaments are twisted together other and important advantages are produced. For example, when a bundle of filaments, prepared from a normally crystalline vinylidene chloride polymer, are simultaneously stretched and false twisted in the supercooled state, according to the method of the present invention, the filaments, are squeezed together and may plastically flow to fill up the open spaces between the filaments. This plastic deforming of the supercooled filaments orients the crystallites and produces fibers which have an irregular cross-sectional shape and a crinkliness which resembles natural fibers. These latter properties produce friction between the filament surfaces when they are spun into yarn or woven into fabric. Furthermore, the crinkliness imparts elasticity to the filaments and causes them to interlock with one another when spun or woven into yarn or fabric.

While the invention is illustrated with polymers which are in the substantially completely supercooled state, the invention is not limited thereby and includes fabricating in the same manner polymers which are partially recrystallized, provided that the degree of recrystallization is not such as to preclude an elongation of at least 100 per cent while false twisting.

The invention, then, is concerned with a process of making crinkly filaments from normally crystalline vinylidene chloride polymers. It is preferable in order to obtain individual filaments which may be spun into yarn having very woolly characteristics to use filaments of a very small diameter and in bundles consisting of from 2 to about 50 individual filaments. When coarser yarns are desired larger filaments may be used, or when yarns of lesser crinkliness and stretchability are wanted they may be obtained by using larger bundles of the filaments or by twisting them to a lesser degree during the stretching. In its broader aspects the invention is limited only by the requirements that the synthetic material used, be a "normally crystalline vinylidene chloride polymer" as herein defined, and that it be worked in the supercooled state in the prescribed manner to obtain filaments having the advantageous properties herein described.

I therefore point out and distinctly claim as my invention:

1. The method which comprises subjecting a plurality of filaments of a normally crystalline vinylidene chloride polymer in the supercooled state to the simultaneous operations of stretching and false twisting.

2. The method which comprises subjecting a plurality of supercooled filaments of a vinylidene chloride-vinyl chloride co-polymer in which the proportion of vinylidene chloride predominates to the simultaneous operations of stretching and false twisting.

3. A crinkly filament composed of a normally crystalline vinylidene chloride polymer exhibiting orientation of the crystallites along the fiber axis, substantially identical to that obtained by subjecting a plurality of filaments of said polymer in the supercooled state to the simultaneous operations of stretching and false twisting.

ALDEN W. HANSON.